(12) United States Patent
Wang et al.

(10) Patent No.: US 8,790,421 B2
(45) Date of Patent: Jul. 29, 2014

(54) NON-WOVEN FABRIC AND METHOD FOR FABRICATING THE SAME, GAS FUEL GENERATION DEVICE AND METHOD FOR GENERATING GAS FUEL

(75) Inventors: Cheng Wang, Hsinchu County (TW); Po-Kuei Chou, Hsinchu County (TW)

(73) Assignee: Young Green Energy Co., Hsinchu County (TW)

(*) Notice: Subject to any disclaimer, the term of this patent is extended or adjusted under 35 U.S.C. 154(b) by 503 days.

(21) Appl. No.: 13/071,486

(22) Filed: Mar. 24, 2011

(65) Prior Publication Data

US 2012/0042564 A1    Feb. 23, 2012

(30) Foreign Application Priority Data

Aug. 18, 2010  (CN) .......................... 2010 1 0258191

(51) Int. Cl.
| | |
|---|---|
| *B01J 19/00* | (2006.01) |
| *B29C 70/68* | (2006.01) |
| *C10L 1/10* | (2006.01) |
| *D04H 13/00* | (2006.01) |
| *D04H 1/541* | (2012.01) |
| *D04H 5/04* | (2006.01) |
| *H01M 8/04* | (2006.01) |
| *H01M 8/06* | (2006.01) |

(52) U.S. Cl.
CPC  *C10L 1/10* (2013.01); *D04H 1/541* (2013.01); *D04H 5/04* (2013.01); *H01M 8/04201* (2013.01); *H01M 8/0606* (2013.01); *H01M 8/065* (2013.01); *Y02E 60/50* (2013.01)

USPC .............. 44/300; 442/364; 422/129; 156/172

(58) Field of Classification Search
USPC ................. 713/320; 222/3; 436/121; 44/300; 442/364; 422/129; 156/172
See application file for complete search history.

(56) References Cited

U.S. PATENT DOCUMENTS

| | | | |
|---|---|---|---|
| 6,673,204 | B2 | 1/2004 | Takai et al. |
| 6,746,496 | B1 | 6/2004 | Kravitz et al. |

(Continued)

FOREIGN PATENT DOCUMENTS

| | | |
|---|---|---|
| CN | 1037555 | 11/1989 |
| CN | 1608974 | 4/2005 |

(Continued)

OTHER PUBLICATIONS

"Office Action of China Counterpart Application", issued on May 28, 2013, p. 1-p. 12.

*Primary Examiner* — Prem C Singh
*Assistant Examiner* — Chantel Graham
(74) *Attorney, Agent, or Firm* — Jianq Chyun IP Office

(57) ABSTRACT

A non-woven fabric reacting with a liquid to generate gas fuel is provided. The non-woven fabric includes a plurality of core-sheath fibers, and each of the core-sheath fibers includes a core layer, a sheath layer, and a plurality of solid particles. The core layer has a first melting point. The sheath layer wraps the core layer and has a second melting point, wherein the first melting point is higher than the second melting point. The solid particles are combined to each of the sheath layers. Moreover, a method for fabricating the non-woven fabric, a gas fuel generation device using the non-woven fabric, and a method for generating the gas fuel are also provided.

18 Claims, 6 Drawing Sheets

(56) References Cited

U.S. PATENT DOCUMENTS

| | | |
|---|---|---|
| 7,306,780 B1 | 12/2007 | Kravitz et al. |
| 2002/0165291 A1 | 11/2002 | Choi |
| 2004/0063215 A1* | 4/2004 | Horiuchi et al. ............. 436/121 |
| 2004/0180598 A1* | 9/2004 | Yang et al. .................... 442/361 |
| 2007/0128434 A1 | 6/2007 | Motoda et al. |
| 2008/0035669 A1* | 2/2008 | Curello et al. .................... 222/3 |
| 2008/0233462 A1 | 9/2008 | Curello et al. |
| 2013/0007486 A1* | 1/2013 | Henroid et al. ............... 713/320 |

FOREIGN PATENT DOCUMENTS

| | | |
|---|---|---|
| CN | 101043091 | 9/2007 |
| CN | 101113551 | 1/2008 |
| CN | 101151406 | 3/2008 |
| JP | 2008231592 | 10/2008 |
| TW | 200809125 | 2/2008 |
| TW | I319020 | 1/2010 |

* cited by examiner

NON-WOVEN FABRIC AND METHOD FOR FABRICATING THE SAME, GAS FUEL GENERATION DEVICE AND METHOD FOR GENERATING GAS FUEL

CROSS-REFERENCE TO RELATED APPLICATION

This application claims the priority benefit of China application serial No. 201010258191.3, filed on Aug. 18, 2010. The entirety of the above-mentioned patent application is hereby incorporated by reference herein and made a part of this specification.

BACKGROUND

1. Field of the Invention

The invention relates to a non-woven fabric, a method for fabricating the non-woven fabric, a gas fuel generation device, and a method for generating gas fuel. Particularly, the invention relates to a non-woven fabric having solid particles, a method for fabricating the non-woven fabric, a gas fuel generation device using the non-woven fabric, and a method for generating gas fuel.

2. Description of Related Art

A fuel cell (FC) is a power generation device capable of converting chemical energy into electricity. Taking a proton exchange membrane FC as an example, the operation principle thereof is as follows. Hydrogen is oxidized in an anode catalyst layer to generate hydrogen ions ($H^+$) and electrons ($e^-$). The hydrogen ions may be transmitted to a cathode through a proton exchange membrane, and the electrons are transmitted to a load through an external circuit and then are transmitted to the cathode. Oxygen supplied to the cathode, the hydrogen ions, and the electrodes may have a reduction reaction in a cathode catalyst layer to generate water. The hydrogen for an anode may be obtained through a hydrogen storage technique via solid sodium borohydride ($NaBH_4$), for example, which water reacts with the reactant (solid $NaBH_4$) to generate hydrogen.

To reduce a size of the reactant, the solid $NaBH_4$ is pressed as a tablet-form. Water would slowly enter the tablet-form solid $NaBH_4$ by infiltration. When the water is insufficient, the water only reacts with $NaBH_4$ on the surface of the tablet-form solid $NaBH_4$ without infiltrating inside the solid $NaBH_4$, which may reduce hydrogen generation efficiency. Moreover, the generated hydrogen may bubble the surface of the solid $NaBH_4$, which hinders the water to enter the interior of the solid $NaBH_4$. Furthermore, after a part of the tablet-form solid $NaBH_4$ reacts with water, a whole structure of tablet-form solid $NaBH_4$ will deforms, so that paths where the hydrogen escapes from the inside of the tablet-form solid $NaBH_4$ are varied, which may cause unstable hydrogen generation rate.

Taiwan Patent No. 1319020 discloses a core-sheath composite fibre capable of being used in collaboration with natural fibre to fabricate non-woven fabrics, in which a sheath material has a melting point of 88° C. to 130° C. approximately, while a core material has a higher melting point than that of the sheath. U.S. Pat. No. 6,673,204 discloses a method for fabricating non-woven fabrics by using polyethylene (PE) and polypropylene (PP). U.S. Pat. No. 6,746,496 discloses a power device, in which a hydrogen generator has micro diffusion particles of boron sodium hydride and catalyst, and the micro diffusion particles reacts with water to generate hydrogen. U.S. Patent No. 20080233462 discloses a solid fuel container, in which a container wall has an absorption layer, and the absorption layer is fabricated by paper fluff, non-woven fabric, paper, and foamed plastic, etc.

SUMMARY OF THE INVENTION

The invention is directed to a non-woven fabric, which is used to react with a liquid to generate gas fuel.

The invention is directed to a method for fabricating a non-woven fabric, and the fabricated non-woven fabric may reacts with a liquid to generate gas fuel.

The invention is directed to a gas fuel generation device, which may improve a gas fuel generation efficiency.

The invention is directed to a method for generating gas fuel, by which a gas fuel generation efficiency may be improved.

Additional aspects and advantages of the invention will be set forth in the description of the techniques disclosed in the invention.

To achieve one of or all aforementioned and other advantages, an embodiment of the invention provides a non-woven fabric, which is used for reacting with a liquid to generate gas fuel. The non-woven fabric includes a plurality of core-sheath fibres, and each of the core-sheath fibres includes a core layer, a sheath layer, and a plurality of solid particles. The core layer has a first melting point. The sheath layer wraps the core layer and has a second melting point, wherein the first melting point is higher than the second melting point. The solid particles are combined to each of the sheath layers.

To achieve one of or all aforementioned and other advantages, an embodiment of the invention provides a method for fabricating a non-woven fabric, and the non-woven fabric is capable of reacting with a liquid to generate gas fuel. Firstly, a plurality of core-sheath fibres is provided, wherein each of the core-sheath fibres includes a core layer and a sheath layer. The core layer has a first melting point. The sheath layer wraps the core layer and has a second melting point, wherein the first melting point is higher than the second melting point. Then, a plurality of solid particles is combined to each of the sheath layers. Then, the core-sheath fibres are shaped.

To achieve one of or all aforementioned and other advantages, an embodiment of the invention provides a gas fuel generation device including a tank, a non-woven fabric, and a guiding structure. The tank is for containing a liquid. The non-woven fabric includes a plurality of core-sheath fibres, and each of the core-sheath fibres includes a core layer, a sheath layer, and a plurality of solid particles. The core layer has a first melting point. The sheath layer wraps the core layer and has a second melting point, wherein the first melting point is higher than the second melting point. The solid particles are combined to the sheath layer. The guiding structure is disposed between the tank and the non-woven fabric, and is capable of guiding the liquid in the tank to the non-woven fabric, so that the liquid is reacted with the solid particles to generate gas fuel.

To achieve one of or all aforementioned and other advantages, an embodiment of the invention provides a method for generating gas fuel. Firstly, a non-woven fabric is provided, wherein the non-woven fabric includes a plurality of core-sheath fibres, and each of the core-sheath fibres includes a core layer, a sheath layer, and a plurality of solid particles. The core layer has a first melting point. The sheath layer wraps the core layer and has a second melting point, wherein the first melting point is higher than the second melting point. The solid particles are combined to the sheath layer. Then, a liquid is guided to the non-woven fabric, so that the liquid reacts with the solid particles to generate the gas fuel.

According to the above descriptions, in an embodiment of the invention, the solid particles are combined to the non-woven fabric. When the liquid is guided to the non-woven fabric, the liquid reacts with the solid particles in the non-woven fabric, so that gas fuel generation efficiency is improved. Moreover, voids in the non-woven fabric would not have structural variations during the reaction, so that paths where the gas fuel escapes from the non-woven fabric may be unchanged, so as to achieve a stable gas fuel generation rate.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
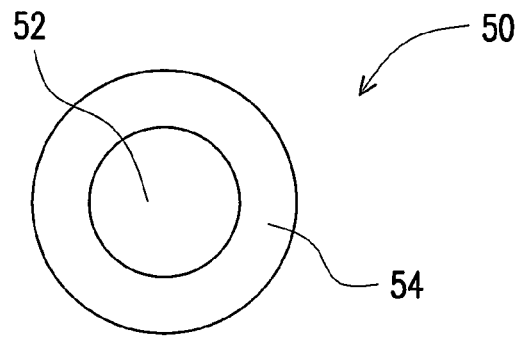
FIGS. 1A-1F are diagrams illustrating a process of fabricating a non-woven fabric according to an embodiment of the invention.

FIGS. 1A-1F are diagrams illustrating a process of fabricating a non-woven fabric according to an embodiment of the invention. Referring to FIG. 1A, a plurality of core-sheath fibres 50 is provided. Each of the core-sheath fibres 50 includes a core layer 52 and a sheath layer 54 wrapping the core layer 52. In the embodiment, materials of the core layer 52 and the sheath layer 54 are plastic materials, and a melting point of the core layer 52 is higher than that of the sheath layer 54. For example, the material of the core layer 52 may be polypropylene (PP) with a melting point of 180° C. approximately, and the material of the sheath layer 54 can be polyethylene (PE) with a melting point of 127° C. approximately. It should be noticed that for clarity, only one core-sheath fibre 50 is illustrated in FIG. 1A.

Figure 1B:
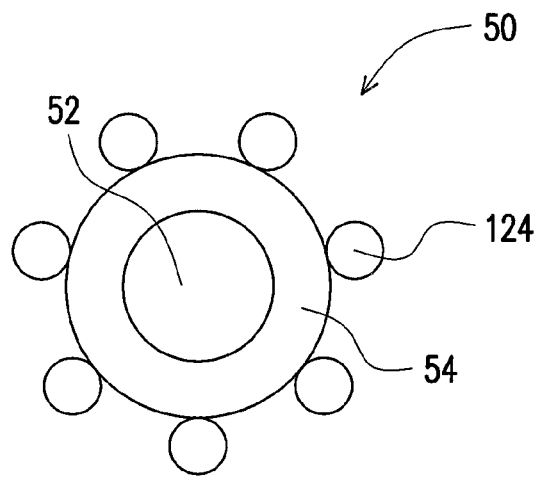
Figure 1C:
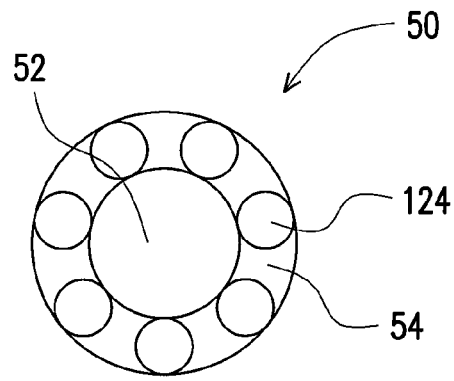

Referring to FIG. 1B, a plurality of solid particles 124 is disposed on the surface of each of the sheath layers 54. Referring to FIG. 1C, the core-sheath fibres 50 are heated, so that the solid particles 124 are combined to the sheath layers 54 by fusion due to the high temperature. During the heating process, a heating temperature is controlled between the melting point of the core layer 52 and the melting point of the sheath layer 54, so that the solid particles 124 is combined to the sheath layer 54 while the core layer 52 is not melted and able to support the whole structure.

Figure 1D:
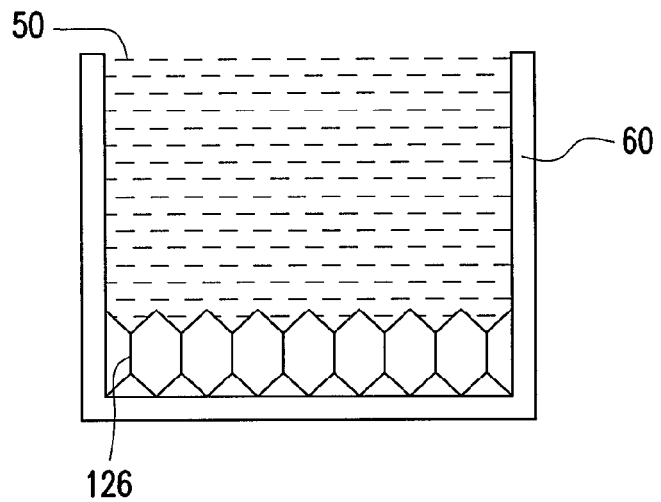
Figure 1E:
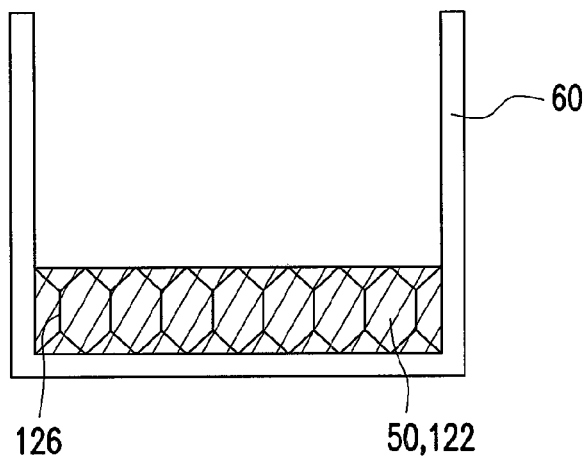

Referring to FIG. 1D, the core-sheath fibres 50 and a frame 126 are disposed in a mold 60, and the core-sheath fibres 50 are molded in the frame 126 as shown in FIG. 1E, so that the core-sheath fibres 50 may form a structure 122 having a plurality of voids. In the embodiment, the frame 126 is used to control a shape of the structure 122, though the invention is not limited thereto. For instance, in another embodiment, the core-sheath fibres 50 are molded in the mold 60 without the frame 126. After the core-sheath fibres 50 are molded, the core-sheath fibres 50 are heated again, so as to shape the core-sheath fibres 50 to fabricate a non-woven fabric 120 as that shown in FIG. 1F.

In the embodiment, the solid particles 124 are combined to the sheath layers 54 through heating, and then the core-sheath fibres 50 are molded and heated to shape. In another embodiment, the solid particles 124 and the catalytic particles (not shown) may be combined to the sheath layers 54 simultaneously, or the catalytic particles are added to the molded core-sheath fibres 50 before or while the core-sheath fibres 50 are heated again, so as to combine the catalytic particles to the sheath layers 54. However, the invention is not limited to the above embodiment, and in other embodiments, the solid particles may be combined to the sheath layers while the core-sheath fibres are shaped. For example, after the core-sheath fibres are provided, the solid particles or the solid particles and the catalytic particles are disposed on the sheath layers, and the core-sheath fibres are molded (the order of disposing the solid particles and molding the core-sheath fibres may be exchanged), and then the core-sheath fibres are heated to shape and simultaneously combine the solid particles or the solid particles and the catalytic particles to the sheath layers.

In addition to the aforementioned method for combining the solid particles, in other embodiments, the solid particles may be deposited on a moving screen mesh and are drained or dried to remove moisture, and then an adhesive is added to adhere the solid particles to the sheath layers. Then, the core-sheath fibres are shaped to form the non-woven fabric. Alternatively, a polymer electrospinning processing technique may be used, by which a polymer solution is mixed with the solid particles to serve as a material for polymer electro spinning, so as to form the non-woven fabric containing the solid particles. Moreover, bundles of fibres may be mixed with the solid particles through adhesion, and then a carding matching having a fine-tooth wheel is used to card the fibres into a fibre web, so that the solid particles are evenly mixed in the non-woven fibres. Moreover, the solid particles may be combined to the non-woven fibres through airflow. In addition, polymer plastic particles may be melt and spun into fibres and are mixed with the solid particles, and then the mixture is cooled on a conveyer belt to form a fibre web containing the solid particles.

The solid particles 124 of the embodiment may be aluminium powder (Al) or metal hydride particles such as sodium borohydride ($NaBH_4$), magnesium hydride ($MgH_2$), or calcium hydride ($CaH_2$). The catalytic particles may be cobalt chloride ($CoCl_2$), cobalt sulfate ($CoSO_4$), ferrous chloride ($FeCl_2$), or nickel chloride ($NiCl_2$). The solid particles 124 may react with water or other liquid to generate gas fuel, for example, hydrogen.

Figure 2A:
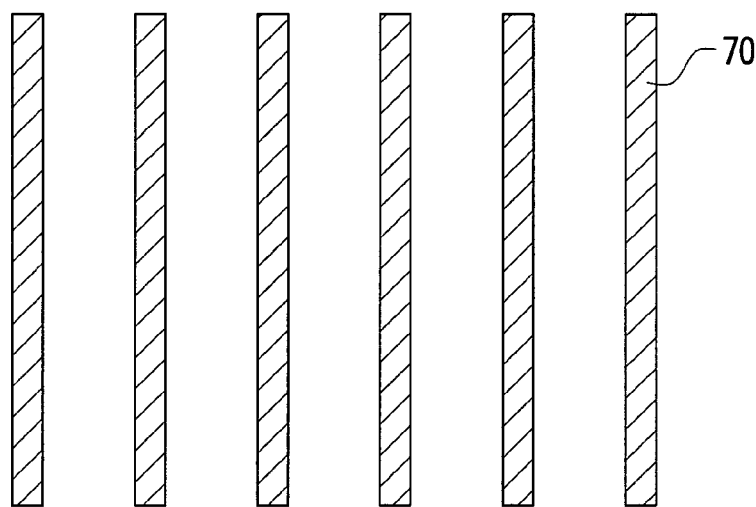
FIG. 2A and FIG. 2B are diagrams illustrating a method for fabricating a non-woven fabric component according to an embodiment of the invention.
Figure 2B:
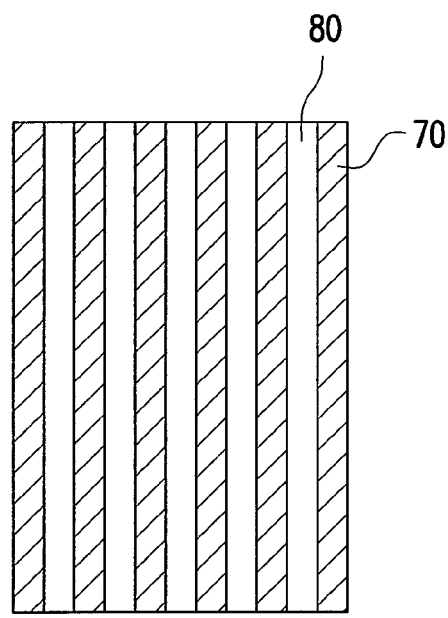

FIG. 2A and FIG. 2B are diagrams illustrating a method for fabricating a non-woven fabric component according to another embodiment of the invention. Referring to FIG. 2A, in the embodiment, the non-woven fabric 120 is used to form a plurality of non-woven fabric units 70. For example, the non-woven fabric 120 is used to fabricate a plurality of tablet-form or plate-form non-woven fabric units 70. Then, the non-woven fabric units 70 and a plurality of waterproof films 80 are stacked in interlace to form the non-woven fabric component. Since the non-woven fabric units 70 are fabricated by the non-woven fabric 120 combined with the solid particles 124, and the non-woven fabric units 70 are separated by the waterproof films 80, after a liquid used for reacting with the solid particles 124 to generate the gas fuel enters the non-woven fabric units 70, the liquid is separated by the waterproof films 80, and is not concentrated in specific positions, so that the liquid may evenly react with the solid particles 124 in each of the non-woven fabric units 70 to generate the gas fuel. However, the invention is not limited thereto. In other embodiments, the non-woven fabric component may be formed by the non-woven fabric units without the waterproof films. A gas fuel generation device using the non-woven fabric and a method for generating the gas fuel are described below with reference of figures.

Figure 1F:
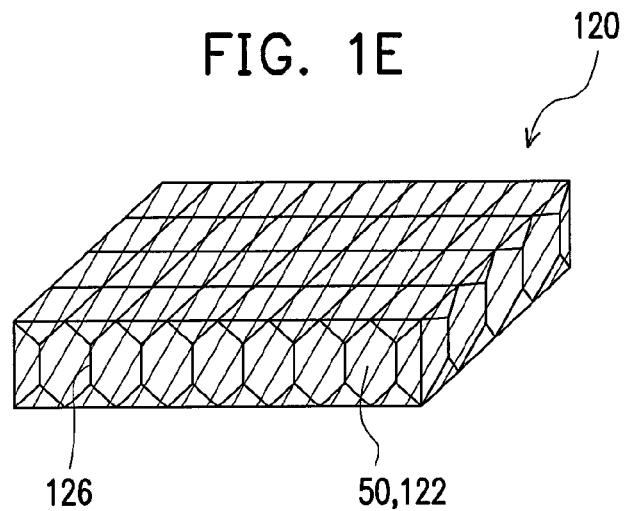
Figure 3:
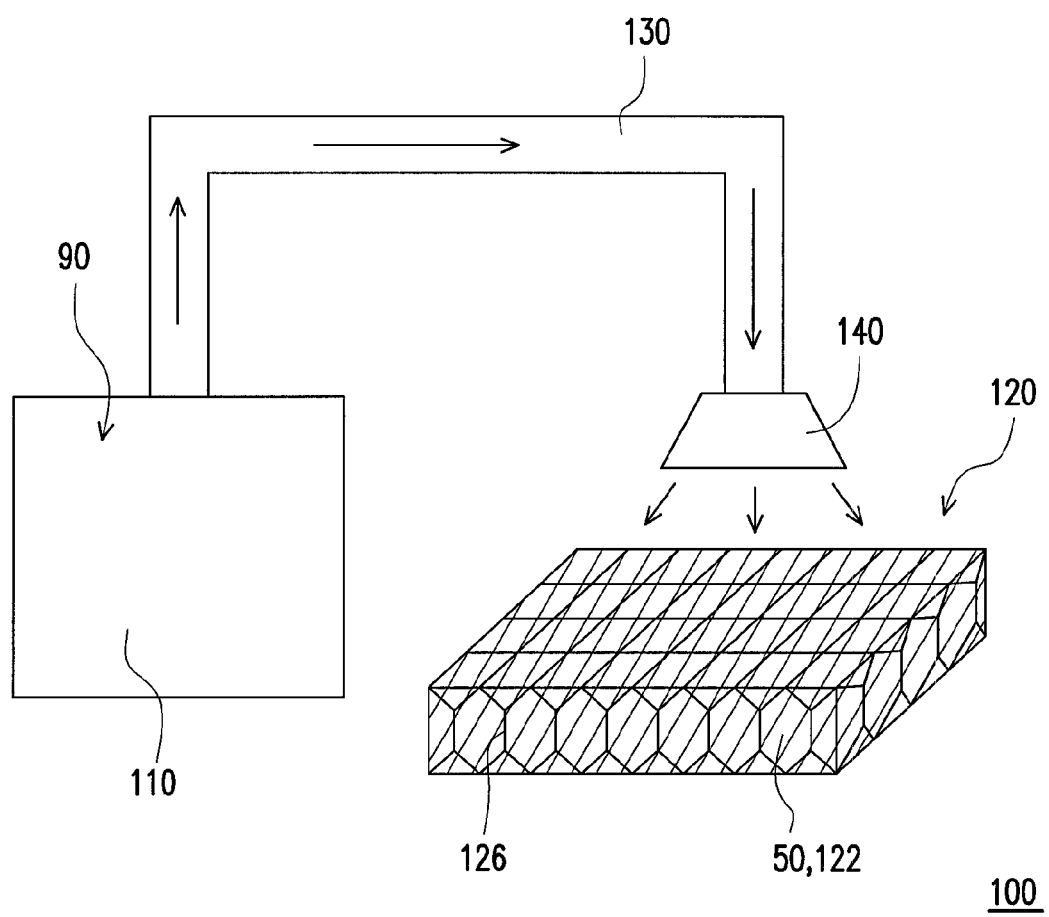
FIG. 3 is a schematic diagram illustrating a gas fuel generation device using the non-woven fabric of FIG. 1F.

FIG. 3 is a schematic diagram illustrating a gas fuel generation device using the non-woven fabric of FIG. 1F. Referring to FIG. 3, the gas fuel generation device 100 of the embodiment provides gas fuel required by a fuel cell. The gas fuel generation device 100 includes a tank 110, the non-woven fabric 120 fabricated according to the processing flow shown in FIGS. 1A-1F, and a guiding structure 130. The tank 110 is used for containing a liquid 90. The guiding structure 130 is disposed between the tank 110 and the non-woven fabric 120. The guiding structure 130 is used for guiding the liquid 90 in the tank 110 to the non-woven fabric 120, so that the liquid 90 reacts with the solid particles 124 (illustrated in FIG. 1C) in the non-woven fabric 120 to generate the gas fuel.

In this way, when the liquid 90 is guided to the non-woven fabric 120, the liquid 90 may react with the solid particles 124 in the non-woven fabric 120, so that a gas fuel generation efficiency could be improved. Moreover, the generated gas fuel may escape from the non-woven fabric 120 through the voids therein for providing to the fuel cell. In the embodiment, the liquid 90 is, for example, liquid water, malic acid, citric acid, sulphuric acid ($H_2SO_4$), baking soda ($NaHCO_3$) water, limewater ($CaCO_3$), or a cobalt chloride ($CoCl_2$) solution, which is used for reacting with the solid particles 124 to generate the gas fuel (for example, hydrogen).

In detail, the gas fuel generation device 100 further includes a spray device 140. The spray device 140 is connected to an end of the guiding structure 130, and the liquid 90 is sprayed on the non-woven fabric 120 by the spray device 140, so that the liquid 90 may evenly infiltrate the non-woven fabric 120. In other embodiments, the non-woven fabric may be used to form a plurality of non-woven fabric units, and then the non-woven fabric units or the non-woven fabric units and the waterproof films are stacked to form the non-woven fabric component (shown in FIG. 2) for replacing the non-woven fabric 120 in FIG. 3. When the gas fuel is to be produced, the guiding structure 130 of FIG. 3 is used to guide the liquid 90 in the tank 110 to the non-woven fabric component.

Figure 4A:
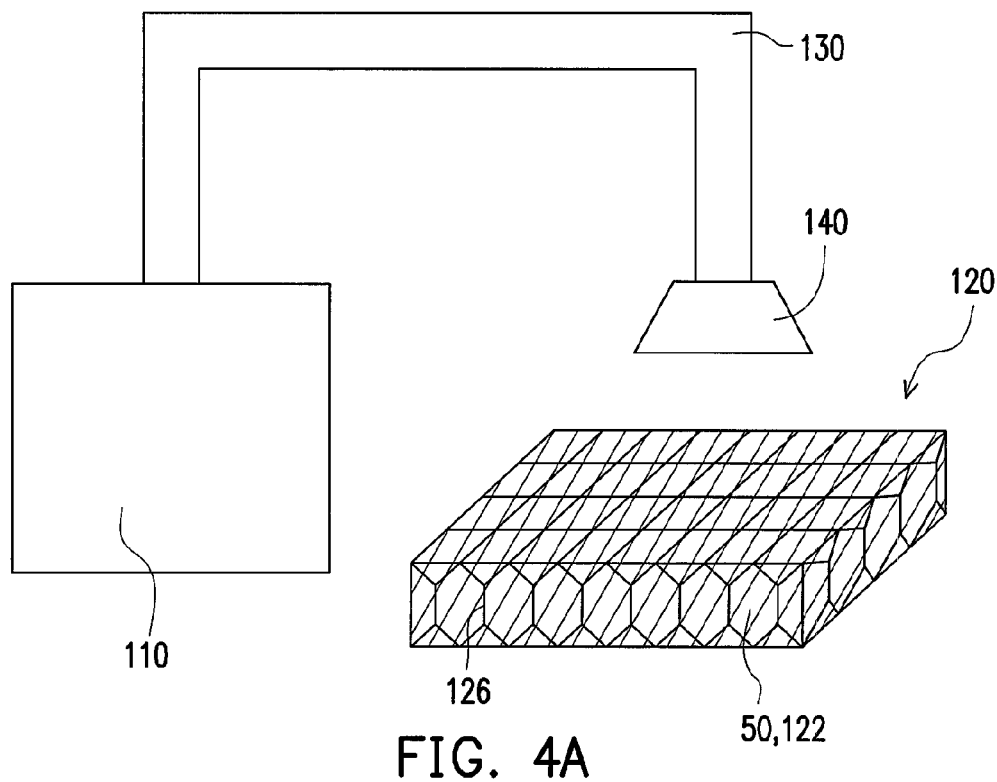
FIG. 4A and FIG. 4B are schematic diagrams illustrating a process of generating gas fuel by using the gas fuel generation device of FIG. 3.
Figure 4B:
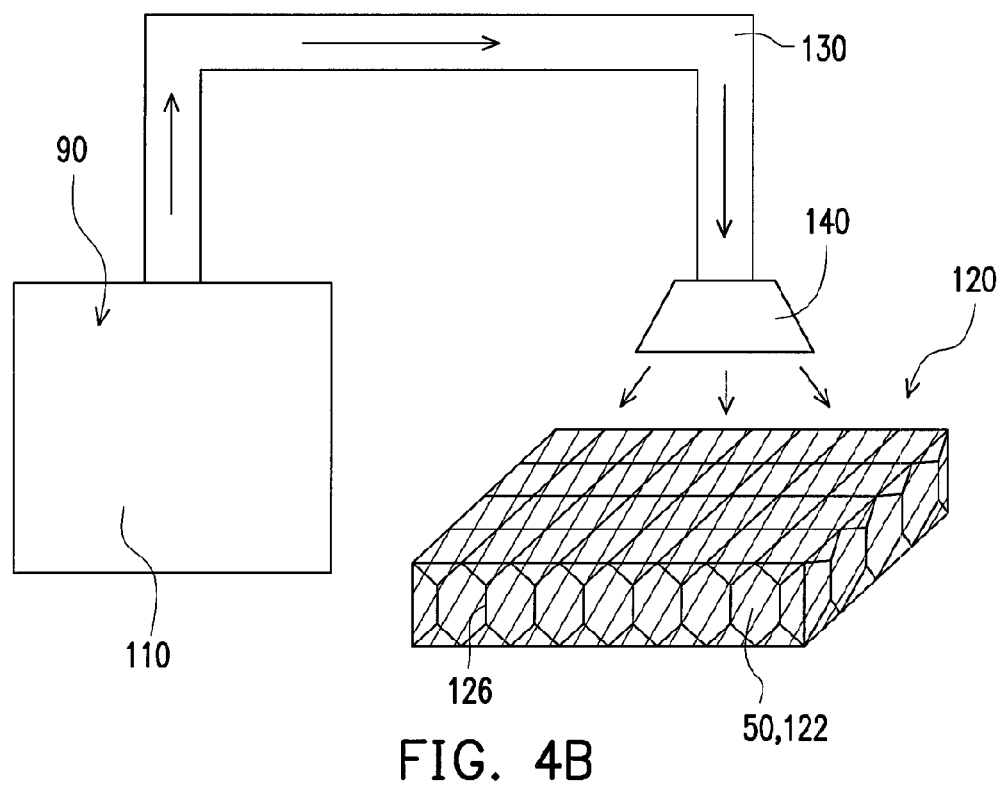
Figure 5:
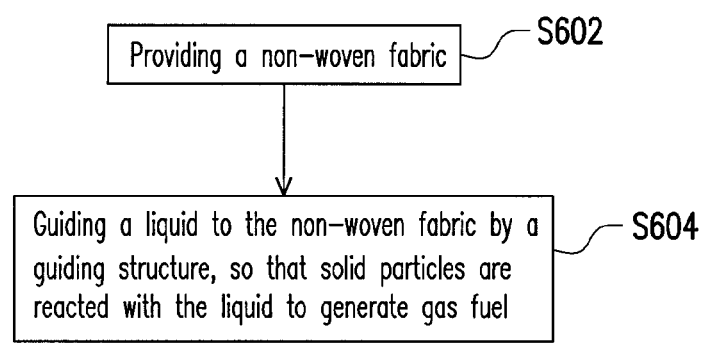
FIG. 5 is a flowchart illustrating the method for generating gas fuel of FIG. 4A and FIG. 4B.

A method for generating the gas fuel is described below with reference of the gas fuel generation device 100 of FIG. 3. FIG. 4A and FIG. 4B are schematic diagrams illustrating a process of generating the gas fuel by using the gas fuel generation device of FIG. 3. FIG. 5 is a flowchart illustrating the method for generating the gas fuel of FIG. 4A and FIG. 4B. Referring to FIG. 4A and FIG. 5, a non-woven fabric is provided (step S602). Then, referring to FIG. 4B and FIG. 5, the guiding structure 130 guides the liquid 90 to the non-woven fabric 120, so that the solid particles 124 (shown in FIG. 1C) reacts with the liquid 90 to generate the gas fuel (step S604), and the generated gas fuel may escape from the non-woven fabric 120 through the voids therein for providing to the fuel cell.

In case that the sheath layers 54 of the non-woven fabric 120 are combined with the solid particles 124 (such as aluminium powder (Al), or metal hydride particles, such as sodium borohydride ($NaBH_4$), magnesium hydride ($MgH_2$), or calcium hydride ($CaH_2$)) and the catalytic particles (such as cobalt chloride ($CoCl_2$), cobalt sulfate ($CoSO_4$), ferrous chloride ($FeCl_2$) or nickel chloride ($NiCl_2$)), the liquid 90 can be liquid water, malic acid, citric acid, sulphuric acid ($H_2SO_4$), baking soda ($NaHCO_3$) water, or limewater ($CaCO_3$), so that the liquid 90 is reacted with the solid particles 124 in an environment with catalyst.

In case that the sheath layers 54 of the non-woven fabric 120 are combined with the solid particles 124 (such as aluminium powder (Al), or metal hydride particles of sodium borohydride ($NaBH_4$), magnesium hydride ($MgH_2$), or calcium hydride ($CaH_2$)) without combining with the catalytic particles, in addition to liquid water, malic acid, citric acid, sulphuric acid ($H_2SO_4$), baking soda ($NaHCO_3$) water, or limewater ($CaCO_3$), the liquid 90 may preferably be a catalytic solution such as a cobalt chloride ($CoCl_2$) solution, a ferrous chloride ($FeCl_2$) solution, a sulfuric acid cobalt ($CoSO_4$) solution, or a nickel chloride ($NiCl_2$) solution, so that the liquid 90 may react with the solid particles 124 in an environment with catalyst.

In summary, in an embodiment of the invention, the solid particles are combined to core-sheath fibres of the non-woven fabric. When the liquid is guided to the non-woven fabric, the liquid is reacted with the solid particles in the non-woven fabric, so that a gas fuel generation efficiency is improved. Moreover, the voids in the non-woven fabric do not have structural variations (for example, the void is enlarged or deformed) during the reaction, so that paths where the gas fuel escapes from the non-woven fabric are unchanged, so as to achieve a stable gas fuel generation rate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A non-woven fabric, for reacting with a liquid to generate gas fuel, the non-woven fabric comprising a plurality of core-sheath fibres, and each of the core-sheath fibres comprising:
   a core layer, having a first melting point;
   a sheath layer, wrapping the core layer and having a second melting point, wherein the first melting point is higher than the second melting point, and materials of the core layer and the sheath layer are plastic materials; and
   a plurality of solid particles, combined into the sheath layer through heating, wherein the solid particles are metal hydride particles for reacting with the liquid.

2. The non-woven fabric as claimed in claim 1, wherein the gas fuel is hydrogen.

3. The non-woven fabric as claimed in claim 1, further comprising a plurality of catalytic particles combined to the sheath layer of each of the core-sheath fibres.

4. A method for fabricating a non-woven fabric, wherein the non-woven fabric is adapted to react with a liquid to generate gas fuel, the method for fabricating the non-woven fabric comprising:
   providing a plurality of core-sheath fibres, and each of the core-sheath fibres comprising:
      a core layer, having a first melting point; and
      a sheath layer, wrapping the core layer and having a second melting point, wherein the first melting point is higher than the second melting point, and materials of the core layer and the sheath layer are plastic materials;
   combining a plurality of solid particles into each of the sheath layers through heating, wherein the solid particles are metal hydride particles for reacting with the liquid; and
   shaping the core-sheath fibres.

5. The method for fabricating the non-woven fabric as claimed in claim 4, further comprising:
   combining a plurality of catalytic particles to each of the sheath layers.

6. The method for fabricating the non-woven fabric as claimed in claim 4, wherein the step of shaping the core-sheath fibres comprises:
   molding the core-sheath fibres; and
   heating the core-sheath fibres.

7. The method for fabricating the non-woven fabric as claimed in claim 6, wherein the step of molding the core-sheath fibres comprises:
   disposing a frame and the core-sheath fibres in a mold; and
   molding the core-sheath fibres in the frame.

8. The method for fabricating the non-woven fabric as claimed in claim 4, wherein the gas fuel is hydrogen.

9. A gas fuel generation device, comprising:
   a tank, for containing a liquid;
   a non-woven fabric, comprising a plurality of core-sheath fibres, and each of the core-sheath fibres comprising:
      a core layer, having a first melting point;
      a sheath layer, wrapping the core layer and having a second melting point, wherein the first melting point is higher than the second melting point, and materials of the core layer and the sheath layer are plastic materials; and
      a plurality of solid particles, combined into the sheath layer through heating, wherein the solid particles are metal hydride particles for reacting with the liquid; and
   a guiding structure, disposed between the tank and the non-woven fabric, for guiding the liquid in the tank to the non-woven fabric, so that the liquid reacts with the solid particles to generate gas fuel.

10. The gas fuel generation device as claimed in claim 9, further comprising a spray device disposed at an end of the guiding structure, wherein the liquid is sprayed on the non-woven fabric by the spray device.

11. The gas fuel generation device as claimed in claim 9, wherein the non-woven fabric further comprises a plurality of catalytic particles combined to the sheath layer.

12. The gas fuel generation device as claimed in claim 9, wherein the non-woven fabric further forms a plurality of non-woven fabric units, and a plurality of waterproof films are disposed between the non-woven fabric units in interlace.

13. The gas fuel generation device as claimed in claim 9, wherein the gas fuel is hydrogen.

14. A method for generating gas fuel, comprising:
   providing a non-woven fabric, the non-woven fabric comprising a plurality of core-sheath fibres, and each of the core-sheath fibres comprising:
      a core layer, having a first melting point;
      a sheath layer, wrapping the core layer and having a second melting point, wherein the first melting point is higher than the second melting point, and materials of the core layer and the sheath layer are plastic materials; and a plurality of solid particles, combined into the sheath layer through heating, wherein the solid particles are metal hydride particles for reacting with the liquid; and guiding a liquid to the non-woven fabric, so that the liquid reacts with the solid particles to generate the gas fuel.

15. The method for generating the gas fuel as claimed in claim 14, wherein the non-woven fabric further comprises a plurality of catalytic particles combined to the sheath layer.

16. The method for generating the gas fuel as claimed in claim 14, wherein the liquid comprises a catalytic solution.

17. The method for generating the gas fuel as claimed in claim 14, wherein the step of providing the non-woven fabric comprises:

forming a plurality of non-woven fabric units by the non-woven fabric; and providing a plurality of waterproof films, and disposing the waterproof films between the non-woven fabric units in interlace.

18. The method for generating the gas fuel as claimed in claim 14, wherein the gas fuel is hydrogen.

* * * * *